United States Patent [19]

Hayashi et al.

[11] 4,036,331
[45] July 19, 1977

[54] VEHICLE ANTI-SKID BRAKE CONTROL APPARATUS

[75] Inventors: Tsutomu Hayashi, Hoya; Takeshi Kawaguchi, Fujimi; Noriyuki Maeda, Tokyo, all of Japan

[73] Assignee: Honda Giken Kogyo Kabushiki Kaisha, Tokyo, Japan

[21] Appl. No.: 690,040

[22] Filed: May 25, 1976

[30] Foreign Application Priority Data

May 31, 1975 Japan .................................. 50-65605

[51] Int. Cl.² ............................................. B60T 8/04
[52] U.S. Cl. .................................. 188/187; 74/752 E
[58] Field of Search ................. 74/750 B, 752 E, 773; 188/180, 181 A, 181 R, 187; 303/6 C

[56] References Cited
U.S. PATENT DOCUMENTS 3,699,826  10/1972  Lumb .................................. 74/752 E Primary Examiner—Duane A. Reger

[57] ABSTRACT

A vehicle anti-skid brake control mechanism consisting solely of mechanical components, particularly for use in two-wheel vehicles comprising a first brake device for primarily absorbing vehicle travelling energy and a second brake device for secondarily absorbing a vehicle travelling energy when the braking force applied by the first brake exceeds a critical level of the braking force corresponding to wheel speeds. The apparatus further comprises a rotation overdrive device adapted to overdrive a rotative inertial body and centrifugal weights in the same direction as that of a wheel hub so as to minimize the shock produced when the braking force transmission means is actuated. A sliding rod is provided with an outer end portion thereof outwardly extended from the axle shaft and has marks indented thereon to visibly sense wear of clutch plates.

12 Claims, 5 Drawing Figures

VEHICLE ANTI-SKID BRAKE CONTROL APPARATUS

BACKGROUND OF THE INVENTION

1. Field of the Invention

The present invention relates to a vehicle anti-skid brake control apparatus, which is constructed only of mechanical members.

2. Description of the Prior Art

In vehicles, particularly in two-wheel vehicles, the need of anti-skid brake control devices, which are inexpensive and can positively be actuated, has recently been emhasized highly in order to provide an additional margin of safety in driving the vehicles. Many anti-skid brake control devices have heretofore been proposed, but most of these devices are costly and have required a complicated construction. In addition, these prior art devices are not satisfactory in fail-safe operation and involve many problems for use in practice, and therefore, they have not yet found their way into general markets.

SUMMARY OF THE INVENTION

It is therefore a primary object of the present invention to provide a novel vehicle anti-skid brake control apparatus, which is constructed only by mechanical members or mechanisms; is compact and simplified in construction so as to form the entire structure into a small size; can avoid an occurrence of any inconvenience particularly when the device is incorporated into a two-wheel vehicle; is lightweight and small-sized; is inexpensive; and has high durability and reliability.

It is another object of the present invention to provide a vehicle anti-skid brake control apparatus, which has a first brake device to primarily absorb a travelling energy and a second brake device is secondarily absorb the travelling energy so that the vehicle is prevented from being suddenly braked, and skidding of the wheels on the roadway may be controlled within the range of safety irrespective of any braking force; the apparatus can provide a relatively smooth and moderate braking; can be entirely constructed from mechanical members; is inexpensive; and can be positively actuated.

It is a further object of the present invention to provide a vehicle anti-skid brake control apparatus, which can allow lubricating oil to possess a cooling effect to provide a highly efficient braking; can form the entire device into a compact-size without the need of providing electrical wirings, power transmission sections such as hydraulic systems and pipings and signal transmission sections; is extremely high in reliability; cannot allow entry of dust or the like from the outside into the device; and is high in durability.

According to the present invention, the brake device is designed to be disposed between a pair of right and left forks so that particularly where the device is applied to a two-vehicle, the brake device may be protected by the forks when the vehicle is turned down, thus preventing the failure of the device. Moreover, the brake device is to be positioned in the central portion of the vehicle body without being laterally biased, thus enhancing the stability of steering.

In addition, according to the invention, a disc brake is provided so that the entire device may be fixed within a relatively small space between the right and left forks. Further, the use of the disc brake enables the braking surface be positioned somewhat away from a position likely exposed to the flying lubricating oil.

According to another novel development, the reversible overdrive device is arranged so that greater braking effect may be achieved even by a small braking torque to thereby minimize the mass of a rotative inertial body used to absorb travelling energy. Centrifugal weights may cooperate with the rotative inertial body to effectively enchance the braking effect.

It is furthermore provided by the invention that the first and second brake devices are arranged with a reversible overdrive device positioned in the midst therebetween so that in the transmission of power, transmission paths are substantially equalized and shortened in distance, and as a consequence, the responsive operation becomes sensitive. In addition thereto, the entire construction is simplified and light-weight.

According to another feature of the invention, the reversible overdrive device consists of various gear components so that disassemblage and assemblage may easily be accomplished. Further, planet gears employed may suitably be increased or decreased in number in order to stabilize rotative movement, and in this case, if one of such planet gears should be damaged, the remaining planet gears would properly perform their function to thereby provide a fail-safe effect. Moreover, the planet gears serve as an oil pump with respect to lubricating oil to circulate the oil.

According to another feature of the invention, a guide member and a centrifugal clutch may be provided to effectively absorb the energy by means of the rotative inertial body. More specifically, the guide member may provide a connection between the centrifugal clutch and the rotative inertial body to achieve stepwise and moderate braking.

According to another feature of the invention, the rotative inertial body is positioned substantially in the central portion of the device so that it may not lose the lateral balance with respect to the vehicle wheels. In addition, when the rotative inertial body is overdriven, a gyroscopic effect may be attained to stabilize a braking posture of the vehicle body by utilization of such effect.

According to a further feature of the invention, a sliding rod, which extends in an axial direction of the axle with an outer end thereof extended outwardly of the axle, is provided so that the thickness of each clutch plate may be magnified with a lever ratio of centrifugal weights to visually and easily sense it from the exterior. Further, the time of replacement of the clutch plate (s) may accurately be read according to the degree of wear thereof by suitable marks, if so provided on the sliding rod.

According to another feature of the invention, a biasing spring is provided, which is utilized to preapply a braking load to the second brake device, so that the braking force at the time of stoppage may be obtained. In this case, a low spring constant of the biasing spring will suffice. Thus, the biasing spring with a low spring constant is used so that even if the clutch plate(s) in the second brake device is worn, a great variation in biasing load relative thereto may be avoided to prevent a material deterioration of effectiveness of the second brake device.

Finally, according to the invention, a first closed chamber encasing therein the second brake device and a second closed chamber encasing therein the rotation overdrive device are positioned separate from but adjacent to each other, so that lubricating oil raised in temperature within the first closed chamber is prevented from being mixed with lubricating oil within the second closed chamber, and therefore, the lubricating oil within the second closed chamber can be maintained at a relatively low temperature, as a consequence of which a sealing member disposed to seal the second closed chamber is not subject to deterioration, thus maintaining the durability thereof.

According to a preferred embodiment of the present invention, there is provided a vehicle anti-skid brake control apparatus comprising: a first brake device A for directly receiving a mechanical braking input to primarily absorb a vehicle travelling energy; and a second brake device B, in which when the braking force applied by said first brake device A exceeds a critical level of the braking force corresponding to wheel speeds, a mechanical circuit for transmitting the braking force applied by said first brake device A is cut off, after which said vehicle travelling energy is converted into an accelerating energy with respect to bodies 34, 57 principally disposed within a wheel hub 3 to thereby secondarily absorb said vehicle travelling energy.

According to a further preferred embodiment of the invention, there is provided a vehicle anti-skid brake control apparatus comprising: a first brake device A for directly receiving a mechanical braking input to primarily absorb a vehicle travelling energy; and a second brake device B, in which when the braking force applied by said first brake device A exceeds a critical level of the braking force corresponding to wheel speeds, a mechanical circuit for transmitting the braking force applied by said first brake device A is cut off, after which said vehicle travelling energy is secondarily absorbed, said second brake device B including rotative inertial body (34), which is rotated about an axle 2, having mass sufficient to absorb a rotation accelerating energy; a reversible overdrive device C which can transmit acceleration in a direction opposite the rotative direction of a wheel hub 3 and can increase a speed to a value greater than that of the rotative speed of said wheel hub (3); centrifugal weights 57 which are rotatably driven through said reversible overdrive device C and which receive the action of a centrifugal force corresponding to the rotative speed thereof for rotative movement while being controlled by the intensity of rotation relative to said rotary inertial body 34; and braking force transmitting means for directly transmitting the braking force to said wheel hub 3.

According to another preferred embodiment of the present invention, there is provided a vehicle anti-skid brake control apparatus comprising: a first brake device A' for directly receiving a mechanical braking input to primarily absorb a vehicle travelling energy; a second brake device B', in which when the braking force applied by said first brake device A' exceeds a critical level of the braking force corresponding to wheel speeds, a mechanical circuit for transmitting the braking force applied by said first brake device A' is cut off, after which said vehicle travelling energy is secondarily absorbed; and a rotation overdrive device C' interposed between said first brake device and said second brake device, said second brake device B' including at least a rotative inertial body 140, which is rotated about the axle 2, having a mass sufficient to absorb rotation accelerating energy; centrifugal weights 162 which receive the action of a centrifugal force for rotative movement corresponding to the intensity of rotation relative to said rotative inertial body 40; and braking force transmitting means 164 for directly transmitting the braking force to a wheel hub 103 in response to said rotative movement of the centrifugal weights 162, whereby when a mechanical circuit for transmitting the braking force applied by said first brake device A' is cut off, said rotation overdrive device C' causes rotation of said wheel hub 103 to increase in the same direction so as to transmit said rotation to said rotative intertial body 140 and centrifugal weights 162.

BRIEF DESCRIPTION OF THE DRAWINGS

The features of the present invention, which are believed to be novel, are set forth with particularity in the appended claims. The present invention, both as to its organization and manner of operation, together with further objects and advantages thereof, may best be understood by reference to the following description, taken in connection with the accompanying drawings, in which

DESCRIPTION OF THE PREFERRED EMBODIMENTS

Figure 1:
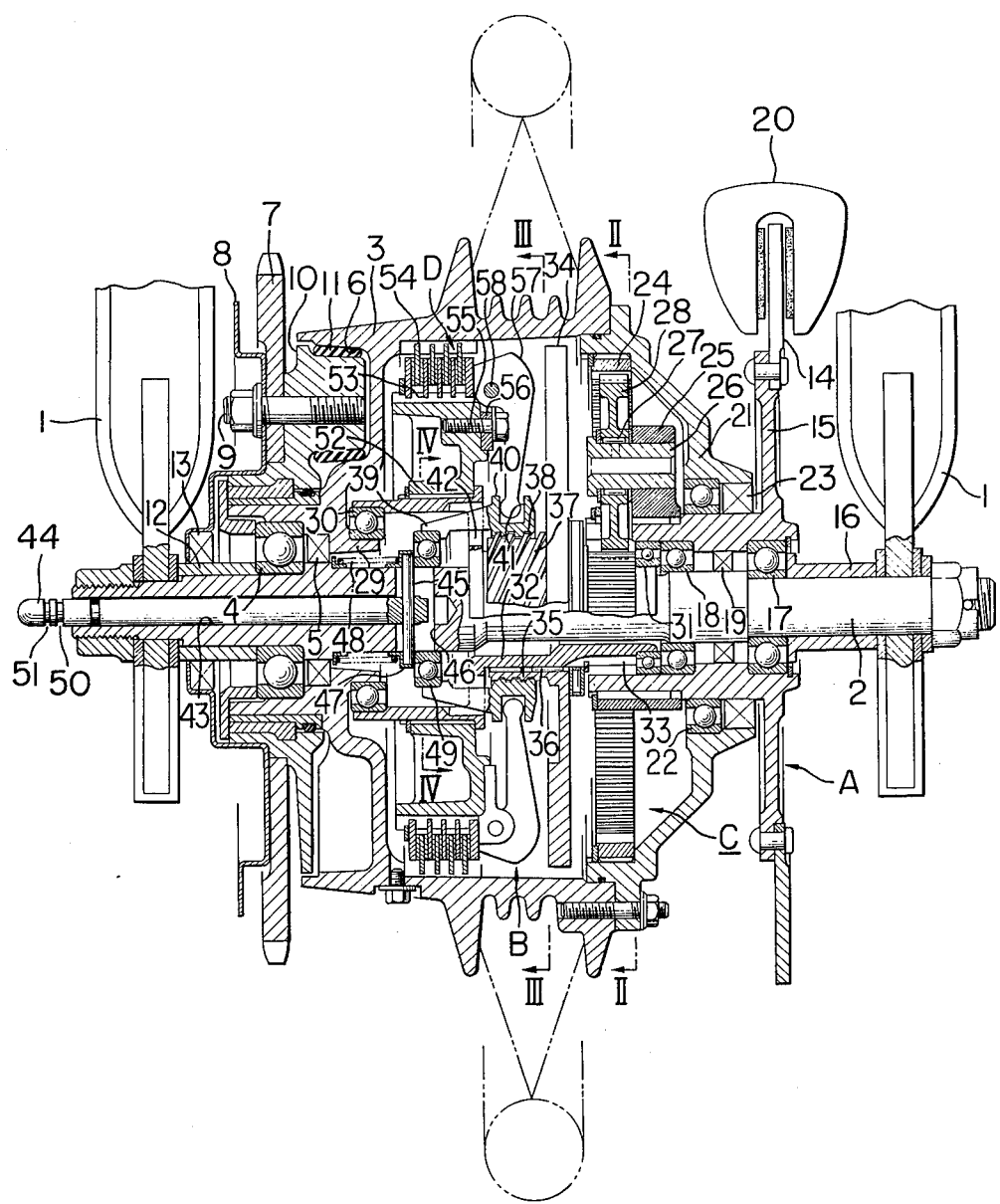
FIG. 1 is a longitudinal sectional view of the novel vehicle anti-skid brake control apparatus, illustrating one embodiment in accordance with the present invention.

Referring to the drawings in detail and initially to FIG. 1 thereof, an axle 2 for a two-wheel vehicle is fixedly supported between a pair of right and left forks 1 and 1' thereof, and the axle 2 has a wheel hub 3, which is of a configuration where the right side thereof is open as viewed in FIG. 1, mounted thereon through a ball bearing 4 and a seal member 5. Within a recess 6 formed in a desired spaced relation in a peripheral direction along the outer surface of the wheel hub 3 is engaged a drive torque transmitting member 10 through a buffer material 11, said transmitting member 10 being fixed by means of a bolt 9 in a desired spaced relation in the periperal direction along with a wheel driving sprocket 7 and a cover plate 8. A sealing member 13 is interpositioned between a sleeve 12 about the axle 2 and an inner peripheral end edge portion of the cover plate 8.

On the right hand upwardly of the axle 2 in FIG. 1, a disc brake 15 provided with a slidable contact portion 14 along the outer peripheral edge thereof is rotatably supported through a ball bearing 17 retained between the shoulder of the axle 2 and a sleeve 16, a ball bearing 18 located inwardly of the ball bearing 17, and a sealing member 19 disposed between the ball bearings 17 and 18, and a brake means 20 is seated astride opposite surfaces of the slidable contact portion 14. The brake means 20 is directly or indirectly connected to a brake actuating means, for example, a brake handle, a brake pedal or the like so that when the brake actuating means is actuated, the brake means 20 bears against the opposite surfaces of the slidable contact portion 14 to impart a braking force to the disc brake 15.

On the outer peripheral surface of a boss portion of the disc brake 15, a wheel cover 21 is rotatably supported through a ball bearing 22 and a sealing member 23. The outer peripheral edge portion of the wheel cover 21 engages the outer peripheral end edge portion of the wheel hub 3 in a liquid-tight fashion so that the wheel cover 21 and the wheel hub 3 are integrally rotated about the axle 2 to form a closed chamber about the axle 2 in cooperation with the boss portion of the disc brake 15.

Figure 2:
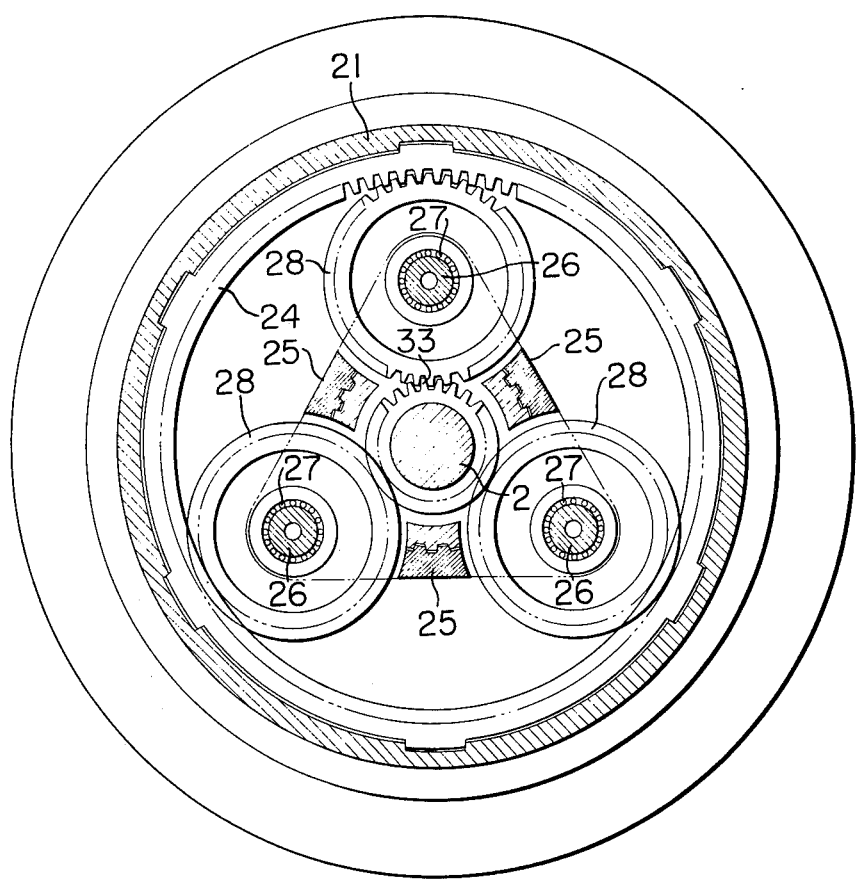
FIG. 2 is a sectional side elevation taken along lines II—II in FIG. 1.

The wheel cover 21 has its outer peripheral edge portion internally formed with an internal gear 24, which engages planet gears 28, each planet gear 28 being rotatably supported through a bearing 27 on a planet gear supporting pin 26 supported by a planet gear supporting member 25 which is splined on the outer peripheral surface of the boss portion of the disc brake 15. As may be seen most clearly in FIG. 2, a plurality (three in the illustrated embodiment) of planet gears 28 are peripherally disposed in desired spaced fashion in order that even if one of these planet gears should be damaged, the remaining planet gears would perform their function. The provision of a plurality of planet gears can avoid uneven centrifugal force during the rotation.

A stepped cyklindrical shaft 32 is rotatably supported on the outer peripheral surface of a protruded annular edge 29 and on the inner peripheral surface of the boss portion of the disc brake 15 through ball bearings 30 and 31, respectively, in such a manner so as to surround the axle 2 in the inner peripheral edge portion of the wheel hub 3. A sun gear 33, which is disposed on the outer peripheral surface of the stepped portion on the right-hand side of the the stepped cylindrical shaft 32 in FIG. 1, is meshed with the planet gears 28.

On the outer peripheral surface in the central portion of the stepped cylindrical shaft 32 is rotatably supported a central cylindrical portion 35 of a flywheel 34 through a bearing 36. This central cylindrical portion 35 has it outer peripheral surface formed with an external thread portion 37 as shown in FIG. 1, and an annular guide member 40, whose inner peripheral surface is formed with an internal thread portion 38 engaged with the external thread portion 37, engages the central cylindrical portion 35 in such a manner so as to surround the outer peripheral surface of the central cylindrical portion 35 of the fly-wheel 34.

As shown in FIGS, 1, 3 and 4, the annular guide member 40 has an annular groove 41 on the outer peripheral surface thereof and a plurality (three in the illustration) of projections 39 peripherally disposed in desired spaced fashion, each projection 39 extending in almost the same direction as that of the axle 2 passing through a through-hole 42 made in the stepped portion of the stepped cylindrical shaft 32.

On the left-hand end of the axle 2, in FIG. 1, there is formed an internal bore 43 along the axis to receive therein a sliding rod 44. A lock pin 45 engages the internal end of the sliding rod 44 so as to meet the sliding rod 44 at right angles. The lock pin 45 can laterally move in the direction of the axle 2 within a through-hole 46, which has an elongated section in an axial direction of the axle 2 and extends through in a diametrical direction of the axle 2. A portion of the lock pin 45 outwardly extended from the interior of the axle 2 is held down by means of an annular pressing member 47, and a biasing spring 48 is retained between the pressing member 47 and a washer held on the shoulder of the axle 2. The lock pin 45 rightwardly biased by the biasing spring 48 rightwardly biases the projections 39 of the annular guide member 40 through a ball bearing 49. The outer end of the sliding rod 44 always remains extended from the left end surface of the axle 2, and the extended portion of the sliding rod is indently provided with an internal mark 50 and an external mark 51.

Fixedly mounted on the outer peripheral surface on the left-hand end of the stepped cylindrical shaft 32 is an annular clutch retainer 52, on the outer peripheral surface of which is disposed a multitude of annular internal clutch plates 53. The internal clutch plates 53 are disposed so that the former may alternately engage a multitude of annular external clutch plates 54 disposed along the internal peripheral surface of the wheel hub 3.

Figure 3:
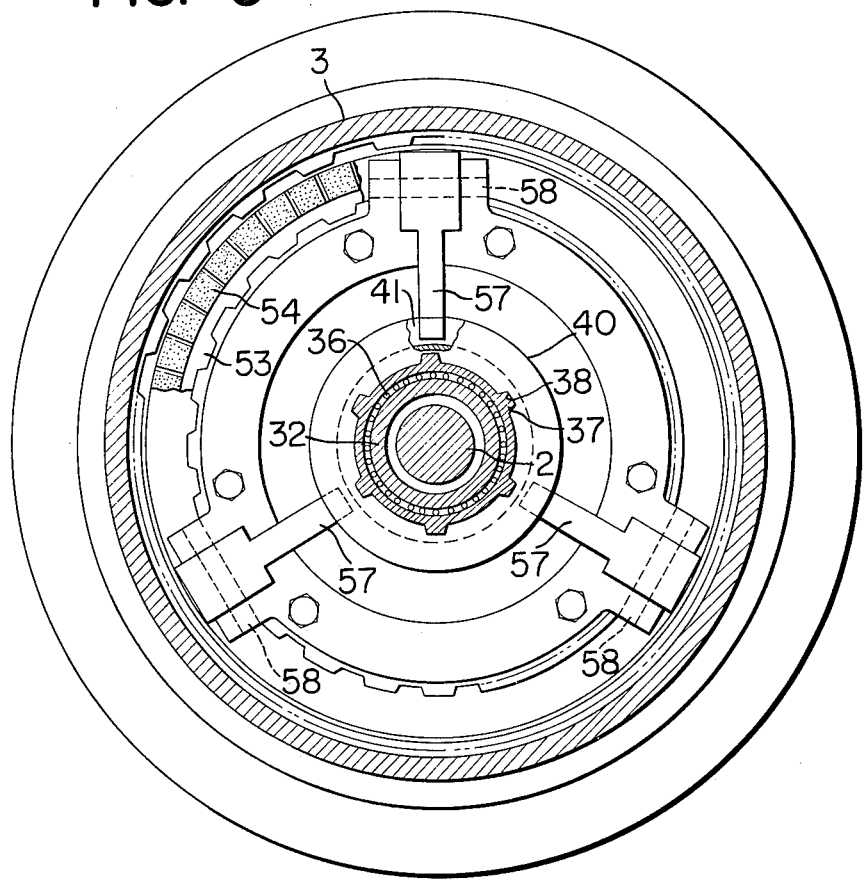
FIG. 3 is a sectional side elevation taken along lines III—III in FIG. 1.
Figure 4:
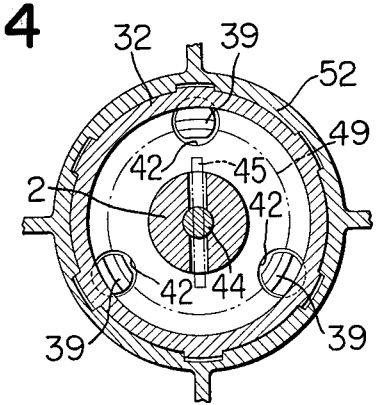
FIG. 4 is a transverse sectional view, illustrating an essential part, taken along lines IV—IV in FIG. 1.

As may be seen most clearly in FIG. 3, on one side of the clutch retainer 52 are pivotally mounted eccentrically a plurality (three in the illustrated embodiment) of centrigugal weights 57 through supporting members 56 fixed to the clutch retainer 52 by means of bolts 55 so that during rotation of the weights 57 abot the wheel axle 2, the centrifugal force acting in a radially outward direction upon the center of gravity of each of the weights 57, eccentrically positioned with respect to the respective pivot 58, causes the respective weights to swing about the pivots 58 to the right in FIG. 1 in a plane containing the axis of the axle 2. The extremity of each centrifugal weight 57 is received in the annular groove 41 in the annular guide member 40, and the centrifugal weight 57 is always biased counterclockwise about the pivotal support 58 by means of the biasing spring 48 through the projection 39 of the annular guide member 40. As the centrifugal weight 57 is rotated counterclockwise, the internal clutch plate 53 and the external clutch plate 54 are placed in contact under pressure with each other into a clutch actuating condition.

During rotation of the vehicle road wheel, the centrifugal weights 57 also rotating with the road wheel are subjected to centrifugal forces which act to swing the weights about the respective pivots 58 in the rightward direction in FIG. 1, whereby the annular guide member 40 tends to be rotatively moved in the rightward direction in FIG. 1 relative to the central cylinder portion 35 of the flywheel 34. On the other hand, it should be noted that the relative rotation between the stepped cylindrical shaft 32 integrally rotating with the annular guide member 40 and the flywheel 34 causes the centrifugal weights 57 to swing about the pivots 58 to the right or left in FIG. 1 depending upon the direction of relative rotation therebetween.

When the sliding rod 44 is inwardly depressed, the centrifugal weights 57 are rotated through the annular guide member 40 provided with the projections 39, and as a consequence, the wearing condition of wear of the internal clutch plate 53 and external clutch plate 54 can be read from the internal mark 50 and external mark 51, respectively, on the sliding rod 44.

From the foregoing construction, it can be seen that when the vehicle is running under the normal conditions, the wheel hub 3, wheel cover 21, disc brake 15, stepped cylindrical shaft 32, flywheel 34 and centrifugal weights 57 all rotate about the axle 2 along with the wheels.

In cases where a braking force less than a prescribed critical level determined by the vehicle speed, is applied by the brake means 20 to the disc brake 15 through the slidable contact portion 14, namely the sum of the resilient force of the spring 48 and the centrifugal weights 57 acting to move the annular guide member 40 in the righthand direction in FIG. 1 is larger than the inertial force of the flywheel 34 tending to cause, upon brake application, a relative rotation between the central cylindrical portion 35 of the flywheel 34 and the annular guide member 40, the centrifugal weights 57 continue to be urged to swing about the respective pivots 58 in the rightward direction in FIG. 1 under the combined action of the resilient force of the spring 48 acting thereon through the bearing 49, the axial projections 39 and the annular guide member 40, and of the centrifugal forces applied thereto, overcoming the inertial force of the flywheel 34 to continuously apply a pressing force to the internal and external clutch plates 53, 54 so that these plates are held in pressure engagement with each other against relative rotation, whereby the road wheel will be effectively braked in conventional manner without causing any wheel locking. In this normal braking process, the travelling energy of the vehicle is mainly absorbed as frictional energy produced by the rotation of the slidable contact portion 14 of the disc brake 15 relative to the brake means 20 with an appropriate amount of sliding friction afforded thereto.

However, if the braking force applied by the brake means 20 to the slidable contact portion 14 of the disc brake 15 during travel of the vehicle exceeds the prescribed critical level determined by the vehicle speed, the wheel hub 3 and the stepped cylindrical shaft 32, which, at this time, are integrally connected with each other for integral rotation by the internal and external clutch plates 53, 54 in clutch operating engagement, are decelerated in rotation together with the disc brake 15, whereupon the inertial force of the flywheel 34 overcomes the restrictive force exerted thereupon by the combined action of the centrifugal forces of the centrifugal weights 57 and the set load of the biasing spring 48 to bring about a relative rotation between the flywheel 34 and the stepped cylindrical shaft 32. At this time, assuming that the road wheels are rotating in such a direction that the upper portions lying above the wheel axle 2 in FIG. 1 are rotating toward the back of the drawing sheet, the annular guide member 40 integrally rotating with the stepped cylindrical shaft 32 is decelerated relative to the central cylindrical portion 35 of the flywheel 34 and rotatively moved in the leftward direction in FIG. 1 thereby to swing the centrifugal weights 57 in the same direction against the total force of the centrifugal forces of the centrifugal weights 57 and the rightward biasing force of the spring 48 so that the contact pressure exerted by the centrifugal weights 57 on the internal and external clutch plates 53, 54 is substantially reduced to place these clutch plates into disengagement from each other, and at the same time, the wheel hub 3 and the stepped cylindrical shaft 32 become free to rotate relative to each other with the consequence that the rotation of the disc brake 15 is rapidly decelerated to stop in a very short period of time under the brake force applied by the brake means 20 to the slidable contact portion 14. In accordance with this rapid deceleration of the disc brake 15, the stepped cylindrical shaft 32 is strongly decelerated in the forward rotating direction (the rotating direction of the road wheel) in a very short time by means of the forward rotating wheel hub 3 through the intermediary of the wheel cover 21, internal gear 24, planerary gears 28 and sun gear 33 so as to be rotated in the reverse direction at a rapidly increasing speed due to the overdriving action of these gears. When the stepped cylindrical shaft 32 reaches a maximum rotation speed corresponding to the rotation speed of the road wheel, the centrifugal weights 57 are subjected to the large centrifugal forces increased sharply due to the rapid rise in rotation speed of the stepped cylindrical shaft 32 to be swung about the pivots 58 to the right in FIG. 1, whereby the internal and external clutch plates 53, 54 are brought into sliding frictional contact with each other. As a result, the rotation speeds of the internal and external clutch plates 53, 54 are instantaneously reduced to produce a relative rotation between the annular guide member 40 and the central cylindrical portion 35 of the flywheel 34 to thereby rotatively displace the annular guide member 40 to the right in FIG. 1 so that the centrifugal weights 57 are caused to swing to the right to press the internal and external clutch plates 53, 54 into much more intimate contacing engagement with each other to further decelerate the rotation speeds of these clutch plates 53, 54. With such sharp rotational deceleration of the internal clutch plate 53, the centrifugal forces of the centrifugal weights 57 are sharply reduced instantaneously to permit the oppositely rotating internal and external clutch plates 53, 54 to come practically out of contact with each other, whereby the brake torque applied by the internal clutch plate 53 to the external clutch plate 54 is also substantially reduced to permit the road wheel to be accelerated progressively to approach the travelling speed of the vehicle. As the rotation speed of the road wheel increases, the stepped cylindrical shaft 32 is accelerated in the reverse direction by the wheel hub 3 through the intermediary of the internal gear 24, the planetary gears 28 and the sun gear 33 with an appropriate overdriving rate determined by these gears and this time the annular guide member 40 is forced to rotatively move in the leftward direction in FIG. 1 through the screwing action of the female and male thread portions 38, 37 caused due to the inertial effect of the flywheel 34 to thereby swing the centrifugal weights 57 about the pivots 58 in the leftward direction in FIG. 1 so that the pressing force of the centrifugal weights 57 against the internal and external clutch plates 53, 54 is further reduced to facilitate the rotational acceleration of the road wheel. When the road wheel reaches a maximum speed of rotation close to the vehicle speed, the centrifugal weights 57 are caused to swing to the right about the pivots 58 under the large centrifugal forces of the centrifugal weights 57 now increased sharply with the rapid rotational acceleration of the stepped cylindrical shaft 32 to place the internal and external clutch plates 53, 54 into pressure contacting engagement with each other so that the road wheel and the stepped cylindrical shaft 32 are momentarily decelerated in rotation due to the large friction developed between the internal and external clutch plates 53, 54. Simultaneously with this deceleration of the stepped cylindrical shaft 32, there takes place a relative rotation between the female and male thread portions 38, 37 on account of the inertial effect of the flywheel 34, whereby the annular guide member 40 is moved further rightwards in FIG. 1 to cause the further rightward swinging motion of the centrifugal weights 57 about the pivots 58 to place the internal and external clutch plates 53, 54 in more intimate contact with each other with a still larger pressing force of the centrifugal weights 57, thereby further reducing the rotational speeds of these clutch plates 53, 54. After discharge of the internal energy of the flywheel 34, the pressing force of the flywheel 34, tending to displace the annular guide member 40 in the leftward direction in FIG. 1, also disappears and the centrifugal force applied to the centrifugal weights 57 during rapid deceleration of the stepped cylindrical shaft 32 is greatly reduced to correspondingly decrease the pressing force thereof against the internal and external clutch plates 53, 54 so that these clutch plates 53, 54 and hence the road wheel and stepped cylindrical shaft 32 being to accelerate. Thereafter, the above described processes of accelerating and decelerating the road wheel and the stepped cylindrical shaft 32 are repeated alternately and thus the travelling energy of the vehicle is most effectively and smoothly absorbed in a stepwise fashion, without any locking of the road wheel, principally by the steps of stopping the rotation of the disc brake 15 and of decelerating the road wheel and the stepped cylindrical shaft 32 together with its associated rotating parts due to the sliding frictional contact between the internal and external clutch plates 53, 54.

In view of the foregoing, it can be seen that the disc brake including the brake disc 15 and the brake force applying means 20 constitutes a first brake device A; the internally toothed ring gear 24, planetary gears 28 and sun gear 33 constitute a rotation overdrive means C; the internal clutch plate 53, external clutch plate 54 and centrifugal weights 57 constitute a centrifugal clutch means D; the flywheel 34 constitutes a rotative inertial body; and the rotation overdrive means C, centrifugal clutch means D, rotative inertial body 57, stepped cylindrical shaft 32, annular guide member 40, annular clutch retainer 52, and biasing spring 48 generally constitute a second brake device B.

Figure 5:
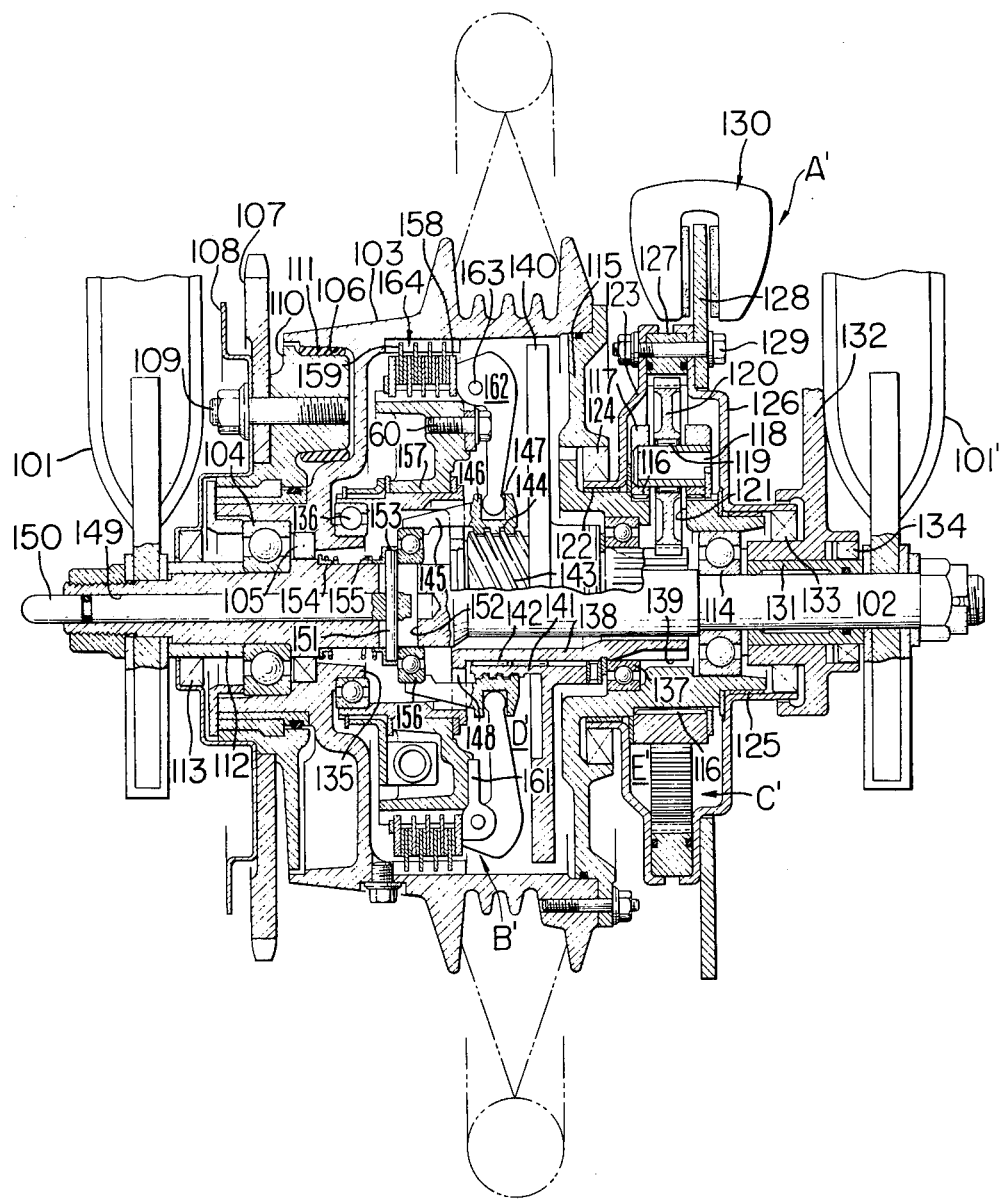
FIG. 5 is a longitudinal sectional view of the vehicle anti-skid brake control apparatus, illustrating another embodiment in accordance with the present invention.

Another embodiment of the device according to the present invention is illustrated in FIG. 5. In FIG. 5, similarly to the case of FIG. 1, an axle 102 for a two-wheel vehicle is fixedly supported betweeen a pair of right and left forks 101 and 101' thereof, and the axle 102 has a wheel hub 103, which is in a configuration where the right side thereof is open as viewed in FIG. 5, mounted thereon through a ball bearing 104 and a seal member 105. Within a recess 106 formed in a desired spaced relation in a peripheral direction along the outer surface of the wheel hub 103 is engaged a drive torque transmitting member 110 throgh a buffer material 111, said transmitting member 110 being fixed by means of a bolt 109 in a desired spaced relation in the peripheral direction along with a wheel driving sprocket 107 and a cover plate 108. A selaing member 113 is interpositioned between a sleeve 112 about the axle 102 and an inner peripheral end edge portion of the cover plate 108.

On the right and side outwardly of the axle 102, a wheel cover 115 is mounted through a ball bearing 114. The outer peripheral edge portion of the wheel cover 115 is closely coupled to the outer peripheral end edge portion of the wheel hub 103, and both the wheel hub 103 and the wheel cover 115 cooperate with each other to form a first closed chamber D' interiorly thereof.

On the outer peripheral surface of the boss portion of the wheel cover 115, a planet gear supporting member 117 is splined through a spline 116. The planet gear supporting member 117 has three planet gear supporting shafts 118 supported thereon in peripherally desired spaced fashion. Each planet gear supporting shaft 118 has a planet gear 120 rotatably supported thereon through a bearing 119. A portion of each planet gear 120 extends towards the axle 102 through a through-hole 121 made in peripherally desired spaced fashion in the boss portion of the wheel cover 115, and protrudes towards the axle 102 instead of the inner peripheral surface of the boss portion of the wheel cover 115.

On the outer peripheral surface of the boss portion of the wheel cover 115, an internal gear cover 123 is mounted through a bearing 122, and similarly, on the outer peripheral surface of the boss portion of the wheel cover 115, an external gear cover 126 is mounted through a bearing 125 opposite the internal gear cover 123 with the planet gear 120 positioned therebetween. A sealing member 124 is interpositioned between the outer peripheral surface of the boss portion of the internal gear cover 123 and the inner peripheral surface of an annular projection protruding on the outer surface of the wheel cover 115.

An internal gear 127 is positioned between the outer peripheral ends of the internal gear cover 123 and the external gear cover 126, respectively, and a brake disc 128 is mounted on the outer surface of one of said outer peripheral ends, said internal gear 127 and said brake disc 128 being integrally fastened by a plurality of bolts 129 positioned in peripherally desired spaced fashion. Each planet gear 120 engages the internal gear 127, and the internal gear cover 123 and the external gear cover 126 cooperate with each other to form a second closed chamber E' so as to encase therein the planet gears 120 and the internal gear 127.

A braking force applying means 130 is disposed in such a manner so as to insert opposite surfaces of the brake discs 128 therein. Thus, the brake disc 128 and the braking force applying means 130 cooperate with each other to constitute a disc brake. The disc brake forms a first brake device A'.

A supporting frame 132 for the braking force applying means 130 is slipped on a sleeve 131, which is in turn slipped on the axle 102 between the fork 101' and the bearing 114. A sealing member 133 is interpositioned between the frame 132 and the external gear cover 126, and likewise, a sealing member 134 is interpositioned between the frame 132 and the sleeve 131 to provide a liquid-tight condition.

Extending to the outer peripheral surface of an annular protruded edge 135 projected so as to surround the axle 2 in the inner peripheral edge of the wheel hub 103 and to the inner peripheral surface of the boss portion of the wheel cover 115 is a stepped cylindrical shaft 138 supported rotatably about the axle 102 through bearings 136 and 137, respectively. On the outer peripheral surface at the end of the stepped cylindrical shaft 138 towards the wheel cover 115, there is formed a sun gear 139, which is meshed with the planet gears 120 within the aforesaid second closed chamber E'.

A cylindrical boss portion 141 of a flywheel 140, which is one form of a rotative inertial body, is rotatably supported through a bearing 142 on the outer peripheral surface in the midst of the stepped cylindrical shaft 138. The cylindrical boss portion 141 has its outer peripheral surface formed with an external thread portion 143. An annular guide member 146, whose inner peripheral surface is formed with an internal thread portion 144 engages the external thread portion 143, engages the cylindrical boss portion 141 in such a manner so as to surround the outer peripheral surface of the cylindrical boss portion 141 of the flywheel 140. The annular guide member 146 has an annular groove 147 formed in the outer peripheral surface thereof and three projections 145 disposed in peripherally desired spaced fashion, each projection 145 extending in substantially the same direction as that of the axle 102 passing through a through-hole 148 made in a stepped portion of the stepped cylindrical shaft 138.

Similarly to the case shown in FIG. 1, on the left-hand end of the axle 102, there is formed an internal bore 149 along the axis to receive threin a sliding rod 150. A lock pin 151 engages the internal end of the sliding rod 150 at right angles. The lock pin 151 can laterally move in the direction of the axle 102 within a through-hole 152, which extends through in a diametrical direction of the axle 102 and has an elongated section in an axial direction of the axle 102. A portion of the lock pin 151 outwardly extended from the interior of the axle 102 is held down by means of an annular pressing member 153, and a biasing spring 155 is retained between the passing member 153 and a washer held on the shoulder of the axle 102. The lock pin 151 rightwardly biased by the biasing spring 155 rightwardly biases the projections 145 of the annular guide member 146 through a bearing 156. The outer end of the sliding rod 150 always remains extended from the left end surface of the axle 2.

Fixedly mounted on the outer peripheral surface of the left-hand end of the stepped cylindrical shaft 138 is an annular clutch retainer 157, on an outer peripheral surface of which is disposed a multitude of annular internal clutch plates 158. The internal clutch plates 158 are disposed so that the former may alternately engage a multitude of annular external clutch plates 159 disposed along the internal peripheral surface of the wheel hub 103.

On the side of the clutch retainer 157 are pivotally mounted three centrifugal weights 162 through supporting members 161 fixed by means of bolts 160 in such a manner as to be rotatable about pivotal supports 163 within a plane containing the center line of the axle 102. The extremity of each centrifugal weight 163 is received in the annular groove 147 in the annular guide member 146, and the centrifugal weight 162 is always biased in counterclockwise direction about the pivotal support 163 by means of the biasing spring 155 through the projection 145 of the annular guide member 146. As the centrifugal weight 162 is rotated in counterclockwise direction, the internal clutch plate 158 and the external clutch plate 159 are placed in contact, under pressure, with each other into a clutch actuating condition. Thus, the internal clutch plate, external clutch plate, and centrifugal weights 162 cooperate with one another to constitute a centrifugal frictional clutch, which is one form of braking force transmitting means 164.

When the wheels are being rotated, the centrifugal weights 162 also rotate about the axle 102 to receive a force by which the weights tend to be rotated in counterclockwise direction in FIG. 5 because of the centrifugal force thereof. When relative rotative movement of the centrifugal weights 162 and the flywheel 140 about the axle 102 is produced, the centrifugal weights 162 each receive a force by which the latter tend to be rotated about the pivotal support 163 because of the interaction between the external thread position 143 and the internal thread portion 144.

In view of the foregoing, it can be seen that when the vehicle is running under the normal conditions, the wheel hub 103, wheel cover 115, brake disc 128, stepped cylindrical shaft 138, flywheel 140 and centrifugal weights 162 all rotate about the axle 102 along with the wheels.

When a braking force less than a maximum braking force corresponding to vehicle speed is applied to the braking force applying means 130 during the travel of vehicle, the centrifugal weights 162 keep the internal clutch plate 158 bearing against the external clutch plate 159 due to the biasing force of the biasing spring 155 and the turning force resulting from the centrifugal force of the centrifugal weights 162, and hence, no relative rotation is produced between the wheel cover 115 and the stepped cylindrical shaft 138 so that the wheels may be braked only by the braking force of the disc brake A'. That is, in this case, the travelling energy of the vehicle is principally absorbed by a friction produced between the brake disc 128 and the braking force applying means 130.

On the other hand, when a braking force in excess of the maximum braking force corresponding to vehicle speed is applied to the braking force applying means 130 during the travel of vehicle, the braking force applied to the brake disc 128 acts in a direction to stop rotation of the planet gears 120. Assuming that the direction of rotation of the wheels is the direction in which the portion above the axle 102 is rotated towards the back of the drawing, in FIG. 5, the braking force applied to the planet gears 120 through the internal gear 127 acts upon the sun gear 139 in such a direction so as to accelerate the centrifugal weights 162. Thus, this braking force may overcome the frictional force produced between the internal clutch plate 158 and the external clutch plate 159 resulting from the biasing force of the biasing spring 155 and the turning force due to the centrifugal force of the centrifugal weights 162 to accelerate the centrifugal weights 162. During that time, the flywheel 140 tends to maintain the same rotative speed as that of the wheels so that relative rotation is created between the centrifugal weights 162 and the flywheel 140 to cause the internal thread portion 144 to move leftwards in FIG. 5 along the external thread portion 143. As a consequence, the centrifugal weights 162 will rotate in a clockwise direction to thereby release the frictional engagement between the internal clutch plate 158 and the external clutch plate 159. Thereafter, as the brake disc 128 stops within a relatively short period of time, the sun gear 139 is accelerated with a high speed-up ratio by the overdriving action of the planet gears 120. Since the accelerating force created at this time is transmitted also to the flywheel 140 through the external thread portion 143 and the internal thread portion 144, the travelling energy of the vehicle is moderately absorbed during the time that the flywheel 140 is accelerated.

After this, the operation of the various components is substantially similar to that of the aforedescribed embodiment shown in FIGS. 1-4 and further description thereof will therefore be unnecessary.

In the embodiment, it should be noted that the disc brake including the brake disc 128 and the brake force applying means 130 constitutes a first brake device A'; the internally toothed ring gear 127, planetary gears 120 and sun gear 139 constitute a rotation overdrive means C'; the internal clutch plate 158, external clutch plate 159 and centrifugal weights 162 constitute a centrifugal clutch means; the flywheel 140 constitutes a rotative inertial body; and the rotation overdrive means C', centrifugal clutch means, rotative inertial body, stepped cylindrical shaft 138, annular guide member 146, and biasing spring 155 generally constitute a second brake device B'.

This embodiment affords various advantages noted below. The provision of the rotation overdriving device enables increase of the braking effect even with a small braking torque, and hence, a rotative inertial body with a relatively small mass may be used. Further, the centrifugal weights may cooperate with the rotative inertial body to extremely efficiently supplement the braking effect. In addition, since the entire device may employ a mechanical construction, it is possible to obtain brake devices, which are inexpensive and can operate positively. Moreover, since the rotative inertial body and centrifugal weights are overdriven by the rotation overdriving device in the same direction as that of the wheel hub, shocks occurring when the braking force transmitting means is actuated are relatively small, and wear in the frictional parts of the braking force transmitting means can be minimized.

What is claimed is:

1. A vehicle anti-skid brake control apparatus comprising:

first brake means for directly receiving a mechanical brake force for primarily absorbing the travelling energy of a vehicle, and second brake means operable, upon application to said first brake means of a brake force in excess of a critical level determined by the travelling speed of the vehicle, for cutting off a mechanical circuit for transmitting the brake force from said first brake means to an associated road wheel of the vehicle and thereafter to secondarily absorb the rest of the vehicle travelling energy not absorbed by said first brake means.

2. A vehicle anti-skid brake control apparatus as defined in claim 1, wherein said first brake means comprises a disc brake including a brake rotatably mounted on a wheel axle for asociation with said second brake means and a brake force applying means secured to a stationary portion of the vehicle in straddling relation with said brake disc.

3. A vehicle anti-skid brake control apparatus as defined in claim 1, wherein said second brake means comprises centrifugal clutch means including a first friction clutch member secured to a wheel hub of an associated road wheel, a second friction clutch member operatively associated with said first brake means and rotatably mounted on a wheel axle of said road wheel, and centrifugal weights mounted for integral rotation with said second clutch member and operable to place said first and second clutch members into or out of frictional contacting engagement with each other depending upon the magnitude of a centrifugal force acting thereon; a rotation overdrive means operatively connecting said wheel hub with said centrifugal clutch means so as to transmit the rotation of said road wheel to said centrifugal clutch means with an appropriate overdriving rate; and a rotative inertial body rotatably mounted on said wheel axle and operatively associated with said centrifugal clutch means such that when the braking force applied to said first brake means exceeds a prescribed critical level determined by the vehicle travelling speed, it acts under inertial effect to force said centrifugal weights to release said first and second clutch members and place them into disengagement with respect to one another for free relative rotation.

4. A vehicle anti-skid brake control apparatus as defined in claim 3, wherein said centrifugal clutch means, said rotation overdrive means and said rotative inertial body are all sealingly confined within the interior of said wheel hub filled with a lubricating oil.

5. A vehicle anti-skid brake control apparatus as defined in claim 3, wherein said centrifugal clutch means and said rotative inertial body are sealingly confined within a first closed chamber defined in said wheel hub filled with a lubricating oil, and said rotation overdrive means is sealingly confined within a second closed chamber disposed outside of said wheel hub with a lubricating oil filled therein.

6. A vehicle anti-skid brake control apparatus as defined in claim 3, wherein said second clutch member is secured to a cylindrical shaft rotatably mounted on said wheel axle for operative association with said rotation overdrive means, and an annular guide member fitted over said cylindrical shaft for axial movement in accordance with relative rotation between said cylindrical shaft and said rotative inertial body, said centrifugal weights each being pivoted at an eccentric point to said cylindrical shaft and including a tip end portion engaged with said annular guide member.

7. A vehicle anti-skid brake control appratus as defined in claim 6 comprising a wheel cover, said wheel hub being closed at one axial side by said wheel cover fixedly secured thereto, said rotation overdrive means comprising a ring gear provided on the inner periphery of said wheel cover, a sun gear provided on the outer periphery of said cylindrical shaft, and a plurality of planetary gears rotatably carried by said brake disc in meshing engagement with both said ring gear and said sun gear, whereby said cylindrical shaft is caused, during disengagement or inoperative condition of said centrifugal clutch means, to accelerate in a rotating direction opposite to that of the vehicle road wheel with an appropriate overdriving rate.

8. A vehicle anti-skid brake control apparatus as defined in claim 6, wherein said rotation overdrive means comprises an internally toothed ring gear secured to said brake disc, a sun gear provided on the outer periphery of said cylindrical shaft, and a plurality of planetary gears secured to said wheel hub for free rotative rotation in meshng engagement with both said ring and said sun gear, whereby said cylindrical shaft is caused during disengagement or inoperative condition of said centrifugal clutch means, to accelerate in the same rotating direction as that of the vehicle road wheel with an appropriate overdriving rate.

9. A vehicle anti-skid brake control apparatus as defined in claim 8, wherein said rotative inertial body comprises a flywheel fitted over said cylindrical shaft for free rotation relative thereto, said flywheel having a cylindrical-shaped, male threaded portion of reduced diameter, said annular guide member being provided on its inner periphery with a female threaded portion adapted to be threadedly engaged with said male thread portion of said flywheel.

10. A vehicle anti-skid brake control apparatus as defined in claim 6, comprising spring means acting on said centrifugal weights to force said first and second friction clutch members into clutch operating condition.

11. A vehicle anti-skid brake control apparatus as defined in claim 6, comprising means for detecting the wear condition of said first and second friction clutch members of said centrifugal clutch means including a sliding rod slidably fitted in an axial bore formed centrally in said wheel axle, said rod having one end in abutting engagement with said annular guide ring to follow the displacement of the tip ends of said centrifugal weights and the other end protruded outwardly from the associated end of said wheel axle.

12. A vehicle anti-skid brake control apparatus as defined in claim 1, wherein said first and second brake means are both disposed between at least one of a pair of left and right front and rear forks of a two-wheeled vehicle.

* * * * *